United States Patent
Shantharam et al.

(10) Patent No.: US 10,637,957 B2
(45) Date of Patent: Apr. 28, 2020

(54) DYNAMIC RUNTIME INTERFACE FOR DEVICE MANAGEMENT

(71) Applicant: VMware, Inc., Palo Alto, CA (US)

(72) Inventors: Shravan Shantharam, Cumming, GA (US); Varun Murthy, Atlanta, GA (US); Yogesh Hande, Sandy Springs, GA (US); Bhuvanesh Shanmuga Sundaram, Atlanta, GA (US); Kalyan Regula, Alpharetta, GA (US)

(73) Assignee: VMWARE, INC., Palo Alto, CA (US)

( * ) Notice: Subject to any disclaimer, the term of this patent is extended or adjusted under 35 U.S.C. 154(b) by 306 days.

(21) Appl. No.: 15/379,901

(22) Filed: Dec. 15, 2016

(65) Prior Publication Data
US 2018/0176326 A1 Jun. 21, 2018

(51) Int. Cl.
G06F 15/16 (2006.01)
H04L 29/08 (2006.01)
G06F 9/451 (2018.01)
G06F 9/445 (2018.01)

(52) U.S. Cl.
CPC .......... *H04L 67/303* (2013.01); *G06F 9/4451* (2013.01); *G06F 9/451* (2018.02); *H04L 29/08072* (2013.01); *H04L 67/02* (2013.01); *H04L 67/34* (2013.01); *H04L 69/329* (2013.01)

(58) Field of Classification Search
CPC ... H04L 29/08072; H04L 29/06; H04L 51/18; H04L 67/34; H04L 67/42
USPC .......................... 709/220, 224, 226, 228, 232
See application file for complete search history.

(56) References Cited

U.S. PATENT DOCUMENTS

| | | | | |
|---|---|---|---|---|
| 8,719,782 | B2 * | 5/2014 | DeHaan | G06F 9/45533 713/100 |
| 9,323,466 | B2 * | 4/2016 | Karandikar | H04L 67/02 |
| 9,648,106 | B2 * | 5/2017 | Karandikar | H04L 67/02 |
| 10,095,688 | B1 * | 10/2018 | Schilling | G06F 11/3438 |
| 10,313,442 | B2 * | 6/2019 | Karandikar | H04L 67/1097 |
| 10,395,027 | B2 * | 8/2019 | Roszak | G06F 21/50 |
| 2011/0107299 | A1 * | 5/2011 | DeHaan | G06F 9/45533 717/121 |
| 2015/0089211 | A1 * | 3/2015 | Karandikar | H04L 67/02 713/100 |
| 2016/0217700 | A1 * | 7/2016 | Zimmer | G09B 5/08 |
| 2016/0316017 | A1 * | 10/2016 | Karandikar | H04L 67/02 |

(Continued)

*Primary Examiner* — Khanh Q Dinh
(74) *Attorney, Agent, or Firm* — Thomas | Horstemeyer, LLP

(57) ABSTRACT

Various examples for providing a dynamic runtime interface for device management are described. In one example, a computing environment can access metadata that describes a configuration of a user interface made in a profile template designer application. The computing environment can identify a request for a profile creator that provides at least one setting for a desired configuration of a client device enrolled with a management service, and, in response to the request being identified, dynamically generate the user interface using the metadata, where the user interface includes a configured to receive the at least one setting for the desired configuration of the client device. The computing environment can generate a configuration profile accessible by the client device that causes an agent application executable on the client device to configure the client device in accordance with the configuration profile.

20 Claims, 7 Drawing Sheets

(56) References Cited

U.S. PATENT DOCUMENTS

2017/0250977 A1* 8/2017 Turner ................... H04L 67/30
2017/0286689 A1* 10/2017 Kelley ................... G06F 21/56
2017/0373995 A1* 12/2017 Panchapakesan ..... H04L 51/046
2018/0167491 A1* 6/2018 Roszak .................. G06F 21/50

* cited by examiner

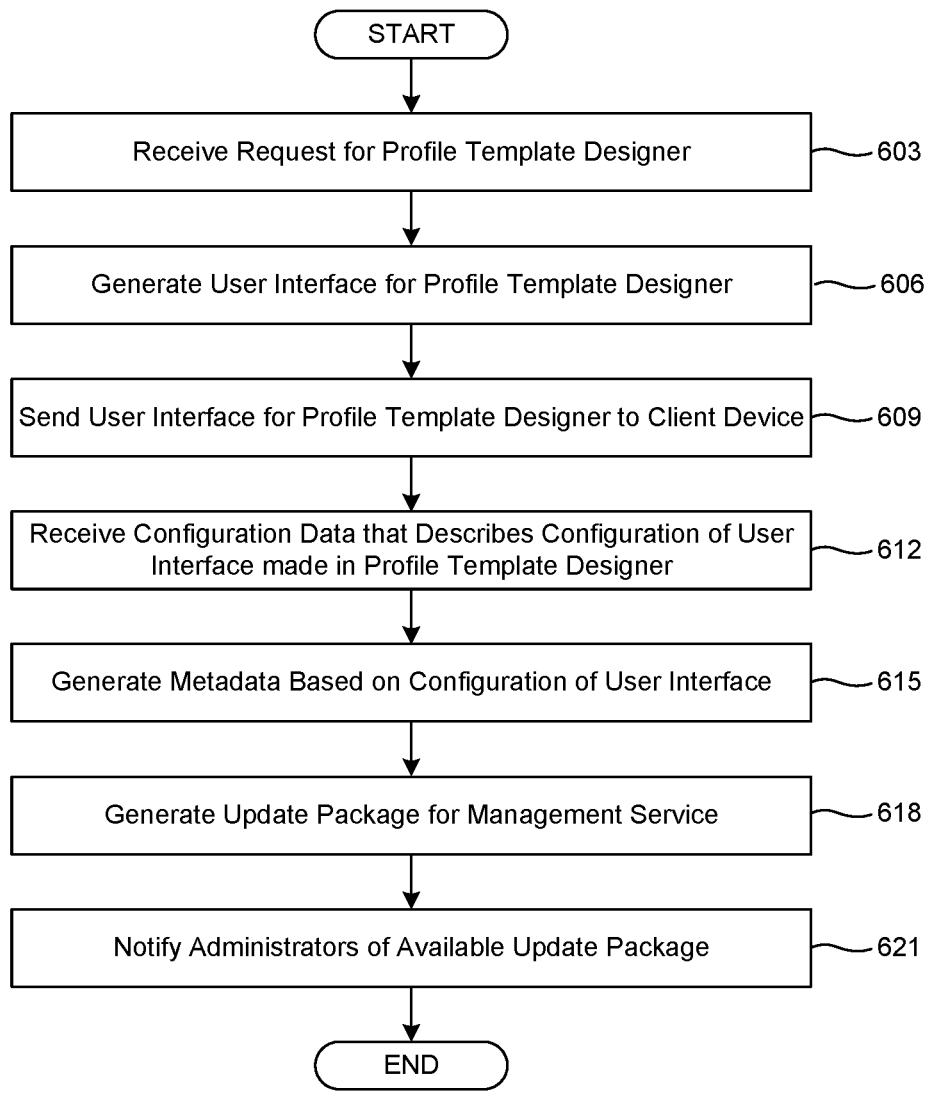
FIG. 6

DYNAMIC RUNTIME INTERFACE FOR DEVICE MANAGEMENT

BACKGROUND

With the emergence of bring-your-own-device (BYOD) technology in the workplace, enterprises permit employees or other personnel to use their own devices for business purposes. This can include accessing enterprise data, such as email and corporate documents. However, prior to an employee using his or her own device in the workplace, a company can require the employee to enroll with a management service capable of protecting enterprise data from theft, loss, and unauthorized access. Administrators of the management service can utilize the management service to oversee operation of the devices enrolled with or otherwise managed by the service.

As devices enrolled with the management service have operating systems installed thereon, capabilities of the operating systems are constantly being changed when patches, security fixes, upgrades, and other updates are made available and installed on the devices. These updates change capabilities of managing devices enrolled with the management service. Administrator consoles that allow administrators to customize the configuration of enrolled devices can become obsolete based on the constant changes to the operating systems. As a result, any configurations of enrolled devices made using obsolete settings would be inconsistent with the capabilities of an operating system potentially subjecting enrolled devices, as well as enterprise data accessible thereon, to numerous security vulnerabilities, such as theft, loss, and unauthorized access.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 6 is a flowchart illustrating functionality implemented by components of the networked environment.

DETAILED DESCRIPTION

Figure 1:
FIG. 1 is a drawing of an example user interface of an administrator console rendered in the networked environment to generate a configuration profile for one or more client devices enrolled with the management service.

The present disclosure relates to a dynamic runtime interface for device management. Administrators of a management service can oversee the operation of the devices enrolled with or otherwise managed by the management service. For instance, an enterprise or other organization can manage BYOD devices of contractors, employees, clients, customers, or other personnel to protect data from theft, loss, and unauthorized access. However, different types of devices can have one or more of a multitude of operating systems installed thereon. For example, devices can have either the Microsoft Windows®, Apple iOS®, Android®, Ubuntu® Linux, or other operating system installed thereon.

A management service can provide administrators with an administrator console to facilitate management of devices enrolled with the management service. For instance, administrators can use the administrator console to specify configurations of a device, resources to be loaded on or made accessible to a device, as well as other information. In one example, an administrator can specify email settings for enrolled devices on behalf of the end users, such that the end users do not have to provide credentials, settings, or other information in order to access email content.

When a configuration of an enrolled device or collection of devices is created through the administrator console, the management service can generate a configuration profile that is made accessible to the enrolled devices. In one example, an agent application installed on the devices accesses the configuration profile and, based on the criteria of the configuration profile, configures the device as specified by the administrator.

A user interface of the administrator console can be problematic because the components of the user interface must match constantly changing capabilities of an operating system. For instance, an administrator can specify a minimum length of characters required for a password for an end user to login to a device. However, the minimum length of characters must also be acceptable by the operating system. If an operating system has a minimum password length requirement of ten characters, the user interface of the administrator console must require ten or more characters as a minimum password length. If an update to the operating system then changes the minimum length of the password requirement to eleven characters, then the ten-character password of the user interface of the administrator console would conflict with the capabilities of the operating system.

As can be appreciated, the capabilities of the operating systems are constantly changed when patches, security fixes, upgrades, and other updates are made available and installed on the devices. Due in part to those frequent changes, administrator consoles can become obsolete.

Additionally, the operating systems, applications, drivers, and other software components installed on a device often require periodic updates to fix security vulnerabilities, improve performance, remove bugs, or conduct other updates. However, when an operating system or other software component is updated on a device, incompatibilities are often created with settings in an administrator console.

For instance, an administrator console can provide one or more user interfaces that allow the administrator to specify a configuration for a device enrolled with a management service. The configuration can include, for example, passcode requirements, network settings, email server settings, permitted functions, restricted functions, as well as other settings that are coalesced into a configuration profile. Permitted functions can include, for example, accessing enterprise data during certain hours of the day or when the device is at a particular location, such as the workplace. Permitted functions can also include, for example, accessing permitted applications, resources, hardware components, such as a camera or Bluetooth® function, or similar functions. Restricted functions, on the other hand, can include, for example, restricting access to camera functions when a device is at a particular location, such as an area having confidential information. Additionally, restricted functions can further include, for example, restricting access to non-permitted applications, resources, hardware components, such as a camera or Bluetooth® function, or other similar functions.

To generate the configuration profile, the administrator can specify a platform, such as Apple iOS®, and create a configuration profile for devices having the platform installed thereon. The user interface accessed by the administrator to generate the configuration profile is static having hard coded fields and, assuming an update to the Apple iOS® platform is made available, the hard coding of the user interface must be manually changed to conform to the update. Additionally, the configuration profile becomes obsolete and incompatible for the updated operating system unless the user interface is updated to allow selections that are compatible with the update.

Accordingly, it can be beneficial for an administrator console to generate a user interface dynamically based on the constantly changing constraints imposed by updates to operating systems or other software components. As used herein, dynamically generating a user interface refers to programmatically generating a user interface "on the fly," or as a request is received, as opposed to providing a static user interface having a hard coded form with hard coded fields. The user interface can be generated dynamically using metadata that is periodically updated and provided to administrator consoles through update packages.

With reference to FIG. 1, an example of a user interface 10 of a profile creator 15 is shown. The profile creator 15 can be accessed by an administrator to configure devices enrolled with a management service, as will be described. For instance, an administrator can select one of a multitude of categories 20 to access a form 25 having various fields 30. The fields 30 shown in FIG. 1 are associated with the "General" category 20, as shown.

The fields 30 associated with the "General" category 20 can include, for example, a "Name" field 30 for a name of the profile to be displayed in the administrator console, a "Version" field 30 for a version of the profile, and a "Description" field 30 for describing a purpose of the profile. Additionally, the fields 30 can include, for example, a "Deployment" field 30 that indicates whether the profile will automatically be removed upon device un-enrollment (a "Managed" setting indicates whether the profile can be removed by an administrator of whether the profile remains installed until removed by an end user), an "Assignment Type" field 30 that determines how a profile is deployed to devices (an "Auto" setting indicates that the profile is deployed to all devices automatically and an "Optional" setting indicates that the end user can optionally install the profile or the profile can be deployed to individual devices at an administrator's discretion), an "Allow Removal" field 30 that indicates whether removal of the profile is permitted by end users, a "Managed By" field 30 that includes email address of authorized administrators, an "Assigned Groups" field 30 that includes designations of user groups, an "Exclusions" field 30 that permits or restricts devices from being excluded from the profile, as well as other fields 30.

Based on input provided in the profile creator 15, devices enrolled with the management service can be configured. For instance, the "Wi-Fi" category 20 can be selected and a corresponding form 25 can be shown in the user interface 10. An administrator can specify a service set identifier (SSID) and a password for a wireless network in the fields 30. Devices enrolled with the management service can be configured to automatically connect to the wireless network using the SSID and the password provided by the administrator.

The profile creator 15 can include a component of an administrator console. When a configuration of an enrolled device or collection of devices is created through the profile creator 15, or other appropriate component of the administrator console, the management service can generate a configuration profile that is made accessible to the enrolled devices. In one example, an agent application installed on the devices accesses the configuration profile and, based on the criteria of the configuration profile, configures the device as specified by the administrator.

Generally, the profile creator 15 is a static user interface 10, meaning the form 25 and the fields 30 are hard coded based on device management capabilities offered by an operating system at the time the profile creator 15 is created. Assuming an update version of an operating system is made available, the hard coding of the user interface 10 will not conform to the update. For instance, version 10.0 of an example operating system can allow administrators to enable or disable camera functionality on enrolled devices. If version 11.0 of the example operating system removes this feature, the user interface 10 of the profile creator 15 can become obsolete if it fails to account for the fact that version 11.0 does not allow the same camera control functions. Additionally, the configuration profile generated as a result of the information obtained through the profile creator 15 can be incompatible with version 11.0 of the operating system.

Figure 2:
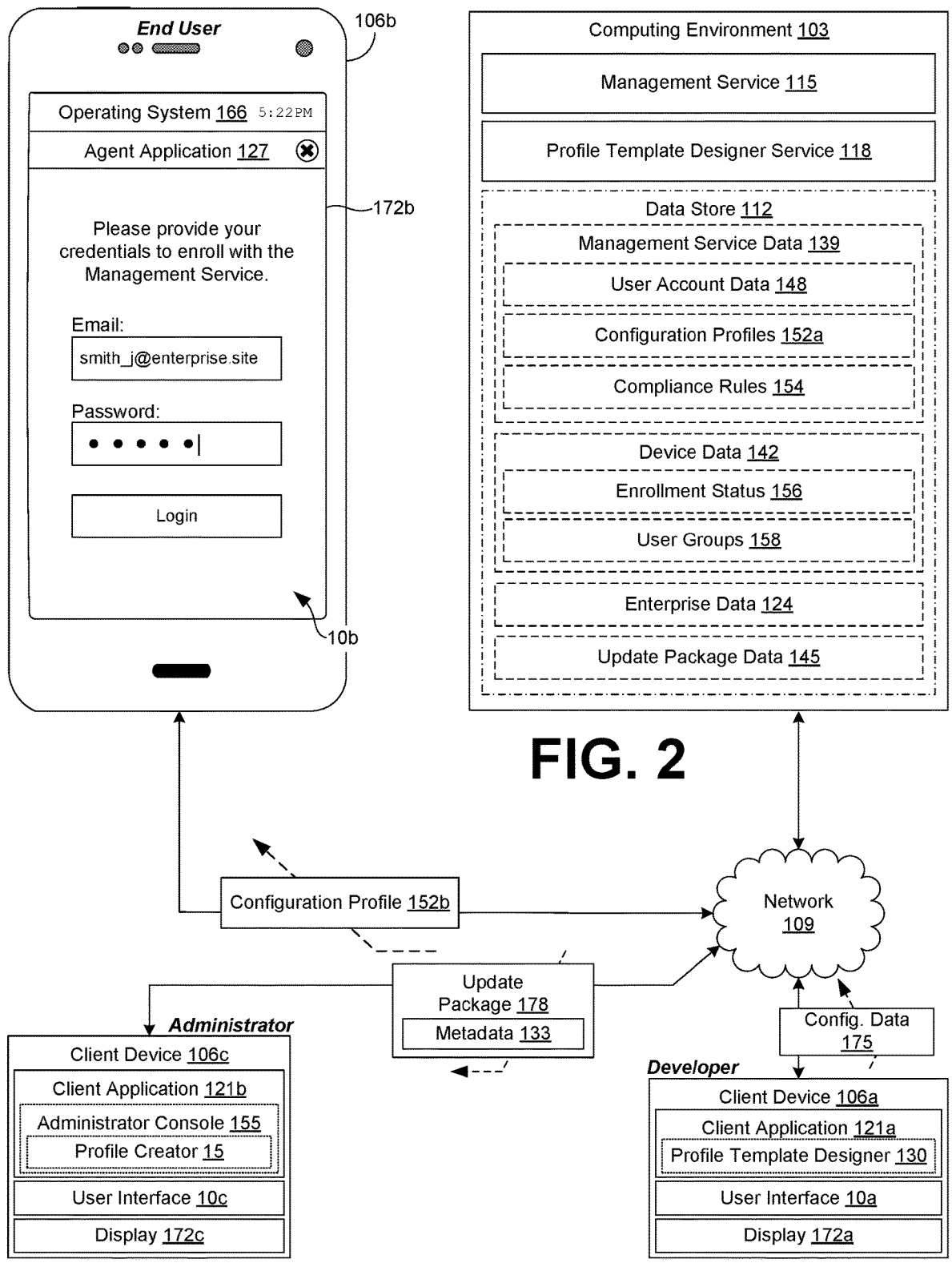
FIG. 2 is a drawing of a networked environment that includes a management service, a profile user interface designer service, and client devices.

With reference to FIG. 2, shown is an example of a networked environment 100. The networked environment 100 can include a computing environment 103 and client devices 106a . . . 106c (collectively "client devices 106") in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed. As the computing environment 103 communicates with the client devices 106 remotely over the network 109, the computing environment 103 can be described as a "remote" or "cloud" computing environment 103.

The computing environment 103 can include a data store 112. The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115, a profile template designer service 118, as well as other applications, services, processes, systems, engines, or functionality not discussed in detail herein. The management service 115 can be executed to oversee the operation of client devices 106 enrolled (or to be enrolled) with the management service 115. In some embodiments, an enterprise, such as one or more companies or other organizations, can operate the management service 115 to oversee or manage the operation of the client devices 106 of its employees, contractors, customers, or other users having user accounts with the management service 115.

The management service 115 can cause various software components to be installed on a client device 106. Such software components can include, for example, client applications 121, resources, libraries, drivers, device configurations, or other similar components that require installation on the client device 106 as specified by an administrator of the management service 115. The management service 115 can further cause policies to be implemented on a client device 106. Policies can include, for example, restrictions or permissions pertaining to capabilities of a client device 106 such that access to enterprise data 124 is secured on the client device 106.

The management service 115 can interact with one or more client applications 121 executed on the client device 106 to perform management functions. In one example, the management service 115 interacts with an agent application 127 on a client device 106 associated with an end user to enroll the client device 106 with the management service 115. When enrolled, the agent application 127 can be registered as a device administrator of the client device 106, which can provide the agent application 127 with sufficient privileges to control the operation of the client device 106. In one example, the agent application 127 can be registered as the device administrator through the installation of a management profile at the operating system of the client device 106 that causes the operating system to designate the agent application 127 as the device administrator.

The management service 115 can direct the agent application 127 to perform device management functions on the client device 106. For example, the management service 115 can direct the agent application 127 to control access to certain software or hardware functions available on the client device 106. As a result, the management service 115 can verify that the configuration and operation of the client device 106 is in conformance with predefined criteria that ensures that enterprise data 124, or other data, is protected from data loss, unauthorized access, or other harmful events.

The management service 115 can further provision enterprise data 124 to the client device 106 through the agent application 127. In one example, the management service 115 can cause the agent application 127 to control use of the client device 106 or provision enterprise data to the client device 106 through use of a command queue provided by the management service 115. In some examples, the management service 115 can store commands in a command queue associated with a particular client device 106 and can configure an agent application 127 executed by such client device 106 to retrieve the contents of the command queue.

In one example, the agent application 127 can be configured to retrieve the contents of the command queue on a configured interval, such as every four hours, or upon detection of a certain event, such as detection of an unauthorized application being executed by the client device 106. The management service 115 can also push commands to the agent application 127.

In any case, the agent application 127 can receive the contents of the command queue from the management service 115. In one example, the contents of the command queue can include a command that the agent application 127 should cause to be executed on the client device 106. In another example, the contents of the command queue can include a resource or other client application 121 that the agent application 127 should cause to be installed on the client device 106, which the client device 106 may access through a specified uniform resource locator (URL).

The profile template designer service 118 provides a profile template designer 130 for access by developers through a client device 106a. The profile template designer service 118 can generate user interface data that can be rendered by the client application 121a of the client device 106a. The profile template designer 130 can be accessed by the developer to customize the appearance and function of the profile creator 15. For instance, the developer can specify categories 20, as well as forms 25 and fields 30 corresponding to the categories 20 that appear in the profile creator 15. Additionally, the developer can specify the arrangement of the categories 20, forms 25, fields 30, and other user interface components. The customized user interface made by a developer is ultimately accessed by administrators of the management service 118.

The data stored in the data store 112 can include, for example, management service data 139, device data 142, enterprise data 124, update package data 145, as well as other data. The management service data 139 can include, for example, user account data 148, configuration profiles 152a . . . 152b (collectively "configuration profiles 152"), compliance rules 154, as well as other data. The user account data 148 can include information pertaining to end users of the client devices 106 enrolled with the management service 115. For instance, the user account data 148 can include data used to authenticate an end user, such as a username, password, email address, biometric data, device identifier, registry identifier, or other data. Additionally, the user account data 148 can include other information associated with an end user, such as name, organization unit, or other information.

Configuration profiles 152 include settings specified by an administrator of the management service 115 to configure the client devices 106 enrolled (or to be enrolled) with the management service 115. For instance, the agent application 127 can configure a client device 106 as specified by a configuration profile 152. The configuration profiles 152 can be generated based on input provided by an administrator through the profile creator 15. To this end, the configuration profiles 152 can indicate particular client applications 121, drivers, or other software components to be installed on the client device 106. Additionally, the configuration profiles 152 can include other settings for the client device 106, such as passcode, network, email, and virtual private network (VPN) settings.

Configuration of a client device 106b for an end user can be performed by the agent application 127, as specified by a configuration profile 152 assigned to the client device 106b. For instance, through an administrator console 155, an administrator can create a configuration profile 152 for a client device 106, a group of client devices 106, or a user group 158. As can be appreciated, some client devices 106 can be configured differently than other client devices 106. In some examples, a configuration profile 152 can include an extensible markup language (XML) document, or other suitable type of file, that can be communicated to the client device 106 or otherwise accessed by the agent application 127.

The compliance rules 154 can include constraints specified by an administrator for compliance of a client device 106 with the management service 115. In one example, the agent application 127 can configure hardware or software functionality of a client device 106 such that the client device 106 is in conformance with the compliance rules 154. For instance, an administrator can specify whether Bluetooth®, camera, microphone, or related features are available on the client device 106. Additionally, the agent application 127 can identify when the client device 106 is not in conformance with the compliance rules 154, as well as other policies, and can take appropriate remedial actions, such as denying access to enterprise data 124, restricting access to particular networks, or enabling or disabling other functionality of the client device 106 of the agent application 127.

In some examples, the management service 115 communicates with the agent application 127 or other client application executable on the client device 106 to determine whether vulnerabilities exist on the client device 106 that do not satisfy compliance rules 154. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of client applications, or other vulnerability as can be appreciated.

Device data 142 can include, for example, data pertaining to an enrollment status 156 for the client devices 106. In one example, a client device 106 for an end user designated as "enrolled" can be permitted to access the enterprise data 124 while a client device 106 designated as "not enrolled" or having no designation can be denied access to the enterprise data 124. Device data 142 can also include data pertaining to user groups 158. An administrator can specify one or more of the client devices 106 as belonging to a particular user group 158. If a client device 106 belongs to one or more user groups 158, the configuration profiles 152 corresponding to the one or more user groups 158 can be made accessible to the client device 106.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system 166 configured to execute various client applications, such as the agent application 127 or other application. Some client applications 121 can access network content served up by the computing environment 103 or other servers, thereby rendering a user interface 10 on a display 172a . . . 172c (collectively "displays 172"), such as a liquid crystal display (LCD), touch-screen display, or other type of display device. To this end, some client applications 121 can include a web browser or a dedicated application, and a user interface 10 can include a network page, an application screen, or other interface. Further, other client applications 121 can include device management applications, enterprise applications, social networking applications, word processors, spreadsheet applications, media viewing applications, or other applications.

Next, a general description of the operation of the components of the networked environment 100 is provided. As static user interfaces 10 can become obsolete due to updates to the operating system 166, for example, it is desired to provide dynamic user interfaces 10 for a profile creator 15 that are quickly and easily updateable based on updates to the operating system 166.

When a new version, patch, security release, or other update of the operating system 166 is made available, a developer can access a profile template designer 130 to design a user interface 10 for the profile creator 15 that includes up-to-date settings and capabilities of the operating system 166. For example, if an updated version of an operating system 166 changes the minimum length of password requirement for the operating system 166 to eleven characters, the developer can access the profile template designer 130 to change any settings specified as the administrator as being no less than eleven characters. Thus, a configuration profile 152 that is ultimately generated through the profile creator 15 will be compatible with the updated version of the operating system 166.

The profile template designer service 118 can generate one or more user interfaces 10 for a profile template designer 130 that can be accessed by a developer, such as a user interface developer, a programmer, or other user with skills suitable for creating a user interface 10. In one example, the profile template designer 130 allows a developer of the management service 115 to add categories 20, forms 25, fields 30, or other user interface components to a user interface 10 of a profile creator 15, or to any other appropriate portion of an administrator console 155. In some examples, the fields 30 that can be added to the user interface 10 include text boxes, dropdown menus, radio buttons, check boxes, buttons, or other user interface components. Additionally, the developer can specify values associated with the fields 30. For example, the developer can specify a name of the field 30, a field label, a default value, selectable options, non-selectable options, or other value. Using the profile template designer 130, the developer can configure the user interface 10 in accordance with the most up-to-date capabilities of an operating system 166.

The client device 106a associated with the developer can send the configuration of the user interface 10 of the profile creator 15 to the management service 115 as configuration data 169. The configuration data 175 can include, for example, the categories 20, forms 25, fields 30, arrangement of the fields 30, values, settings, and other data specified by the developer in the profile template designer 130.

The management service 115 can use the configuration data 169 to generate metadata 133. In one example, the metadata 133 includes, for example, a new user interface 10 to be shown in the profile creator 15 in place of the existing user interface 10. In another example, the metadata 133 can include, for example, changes or an update to the existing user interface 10 based on new capabilities of an operating system 166 or other software component.

In other examples, the metadata 133 includes XML code, hypertext markup language (HTML) code, or other appropriate data for generating a user interface 10 dynamically. For instance, instead of loading a static web page, the metadata 133 can be used to generate a user interface 10 generated dynamically or "on the fly," as will be discussed. In another example, the metadata 133 can include data arranged in a hierarchical arrangement where data is nested in tags based on the arrangement of the fields 30.

The management service 115 can store the metadata 133 in association with an update to an operating system 166 in the data store 112. In some examples, the metadata 133 can be communicated directly to the client device 106c for use by the profile creator 15. However, in some situations, an administrator may not desire to update configuration profiles 152 for client devices 106 enrolled with the management service 115. Thus, in some examples, the management service 115 can generate an update package 178 for the administrator console 155 that can be installed automatically or manually by an administrator to update various user interfaces 10, settings, or other features of the administrator console 155. For instance, when an updated version of an operating system 166 or other software component becomes available, the management service 115 can generate an update package 178 that allows an administrator to update the administrator console 155 to provide functionality and support for new or updated features of the operating system 166. Installing the update package 178 can be thus be optional.

An install of the update package 178 in the administrator console 155 can, for example, replace or update the user interface 10 of the profile creator 15. Additionally, it can update the type of data provided by the client device 106c of the administrator that is used by the management service 115 to generate a configuration profile 152. In some examples, the administrator console 155 can unpack or uncompress the update package 178 and store the metadata 133 in a suitable directory so that in can be accessed when dynamically generating a user interface 10 for the profile creator 15.

Using the updated administrator console 155, an administrator can access a user interface 10 for the profile creator 15 to generate a configuration profile 152. In some examples, when the administrator requests to access the profile creator 15, a user interface 10 of the profile is generated dynamically using, for example, the metadata 133. For instance, instead of loading a static web page, the user interface 10 can be generated in accordance with the metadata 133. In one example, the management service 115 can provide user interface data for rendering on the client device 106c of the administrator. The management service 115 can access the metadata 133 to generate a user interface 10 for the profile creator 15 dynamically, or in response to a request by the administrator. The dynamically generated user interface 10 for the profile creator 15 is thereby shown to the administrator having categories 20, forms 25, and fields 30 that match the current capabilities of the operating system 166. The administrator can thus provide configuration settings to the management service 115 that are compatible with the updated version of the operating system 166.

Once an administrator has provided any necessary settings in the profile creator 15, the management service 115 can generate a configuration profile 152 based on the settings specified by the administrator. The configuration profile 152 can include a file having the settings specified by the administrator stored therein. For example, the configuration profile 152 can include an XML document or similar type of file where the settings specified by the administrator are embedded in XML schema in the XML document. The configuration profile 152, such as the XML document, can be made accessible to user groups 158 by sending the configuration profile 152 to client devices 106 or by making the configuration profile 152 available through a uniform resource locator (URL). For example, an agent application 127 installed on a client device 106 that belongs to a user group 158 can access the configuration profile 152 at the URL to configure the client device 106 according to the settings specified in the XML schema or otherwise set forth in the file.

Figure 3:
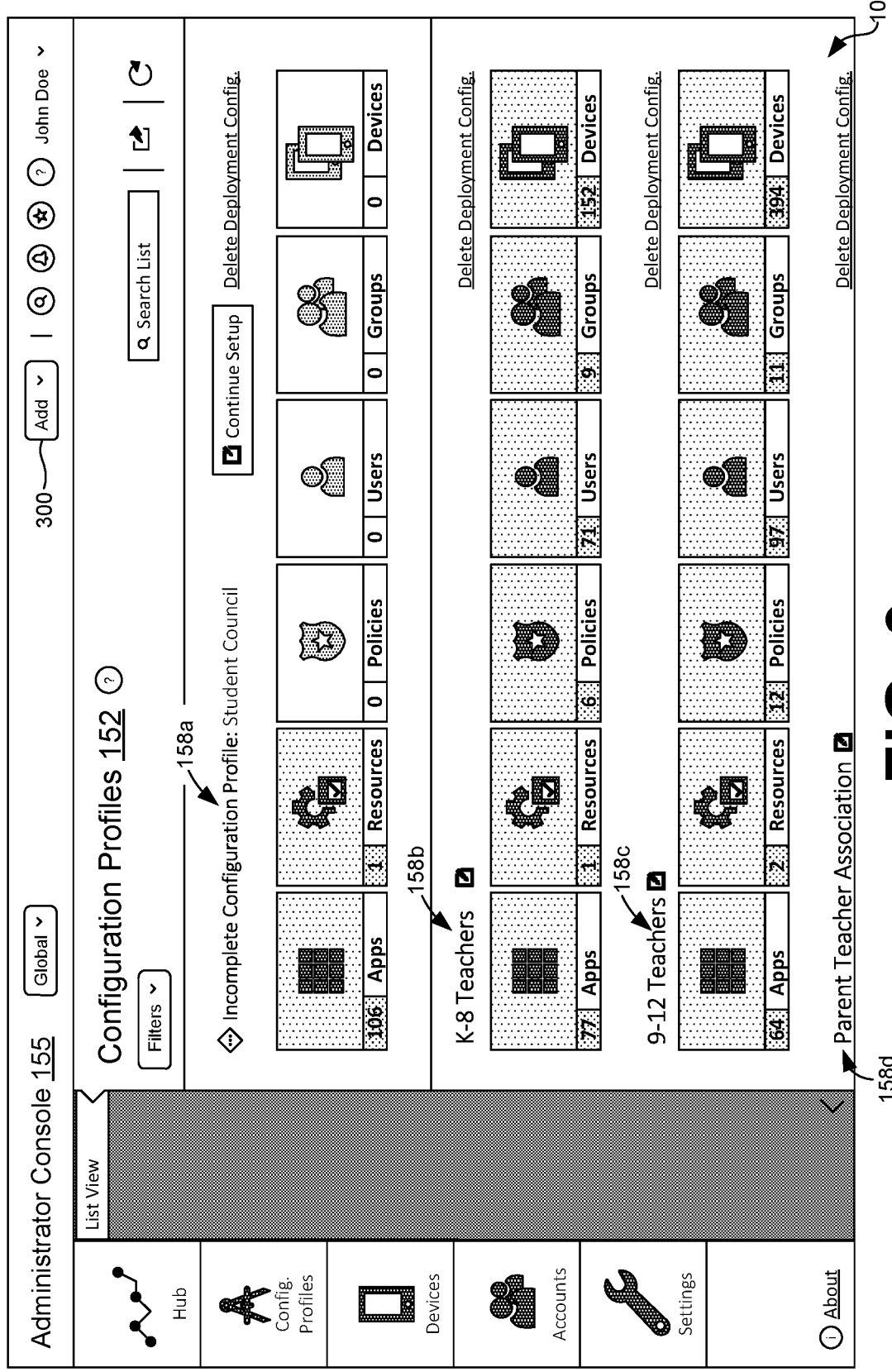
FIG. 3 is a drawing of an example user interface of an administrator console rendered in the networked environment to manage configuration profiles for one or more client devices enrolled with the management service.

Referring next to FIG. 3, a user interface 10 of an administrator console 155 is shown according to one or more examples. The administrator console 155 can be used by one or more administrators of the management service 115, for example, to oversee or manage client devices 106 enrolled with the management service 115. In the example of FIG. 3, a user interface 10 is shown to facilitate management of configuration profiles 152 for various user groups 158a . . . 158d, such as "Student Council," "K-8 Teachers," "9-12 Teachers," and "Parent Teacher Association." While the user interface 10 of FIG. 3 shows existing configuration profiles 152, a new configuration profile component 300 can be selected or otherwise manipulated to access the profile creator 15, as shown in FIG. 1.

Using the profile creator 15 or similar component of the administrator console 10, an administrator can specify permitted applications to be automatically installed on the client devices 106, or permitted for manual installation by an end user. For example, an administrator can automatically designate an anti-virus or anti-malware application be automatically installed on the client device 106 while specifying that an end user is permitted to download various word processing, web browsing, or spreadsheet applications. The administrator can also specify resources that can be installed on or made accessible to client devices 106 associated with particular user groups 158. Resources can include files, such as documents, images, media files, video files, or similar types of resources. The administrator can also specify policies to be implemented on the client devices 106, for example, by the agent application 127. Policies can include, for example, restrictions or permissions pertaining to capabilities of a client device 106 such that access to enterprise data 124 is secured on the client device 106. Additionally, the administrator can designate which client devices 106 are associated with particular ones of the user groups 158.

Figure 4:
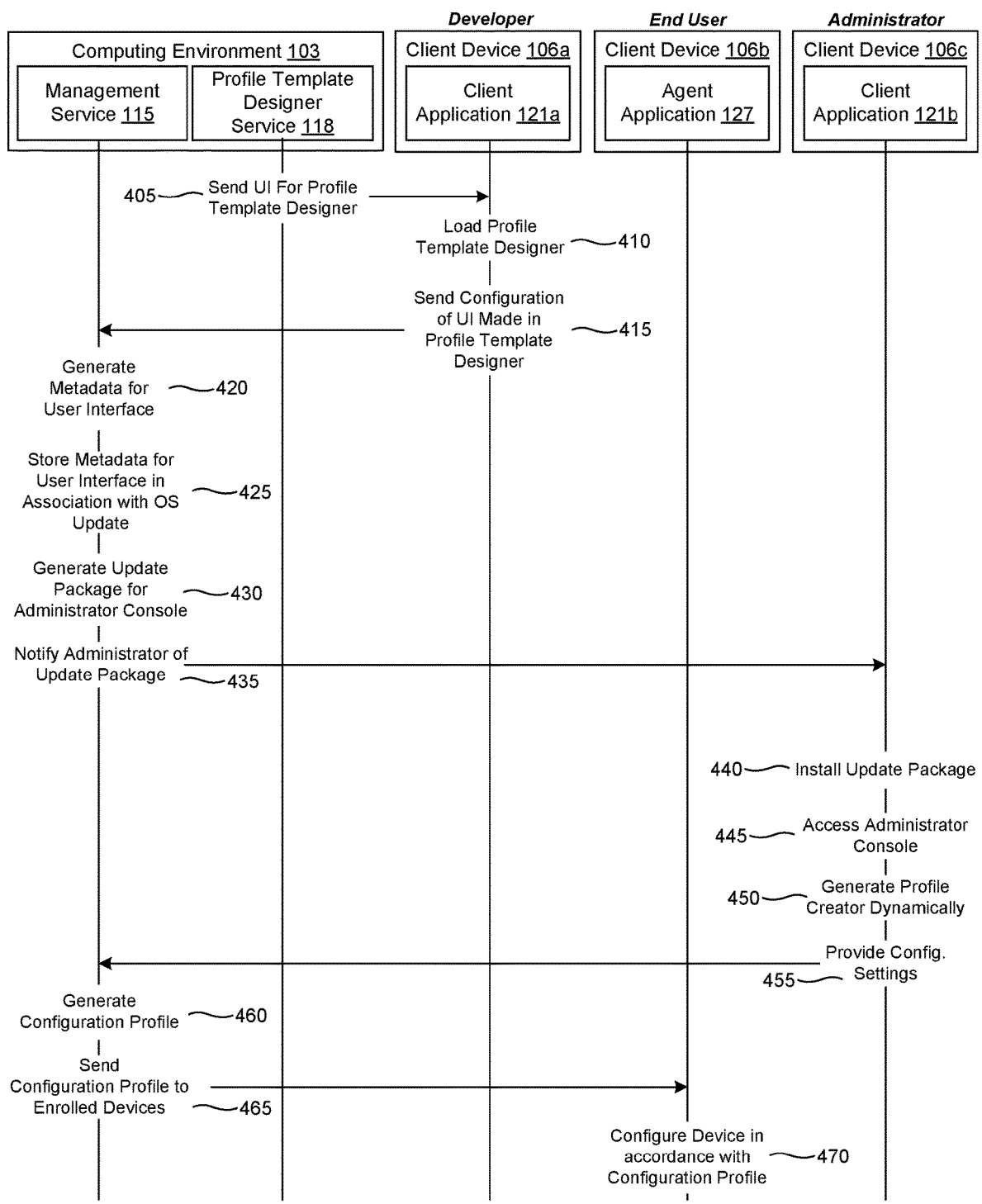
FIG. 4 is a sequence diagram illustrating functionality implemented by components of the networked environment.

Turning now to FIG. 4, a sequence diagram 400 is shown illustrating functionality implemented by components of the networked environment 100. As noted above, it can be desired to provide up-to-date device management capabilities of an operating system 166 to administrators of the management service 115 relatively quickly. To this end, when an updated version of an operating system 166 is made available, a developer can access a profile template designer 130 to design the user interface 10 that includes the up-to-date settings and capabilities of the updated version of the operating system 166. For example, if an updated version of an operating system changes the minimum length of password requirement for the operating system to eleven characters, the developer can access the profile creator 15 to change a selectable setting to no less than eleven characters. Thus, a configuration profile 152 that is ultimately generated through the profile creator 15 will be compatible with the updated version of the operating system 166.

A client device 106a associated with a developer may be distinguished from a client device 106b associated with an end user as well as a client device 106c associated with an administrator. For instance, a developer may be associated with an entity that offers the management service 115 as a service to various enterprises, such as corporations. The administrator can be personnel of a corporation, such as an information technology (IT) administrator hired by the corporation. The end users can include employees of the corporations or similar types of end users.

Starting with step 405, the profile template designer service 118 can generate and send a series of one or more user interfaces 10 for a profile template designer 130 to a client device 106a associated with a developer. The user interface 10 can provide a developer of the management service 115 with the ability to add categories 20, forms 25, fields 30, or other user interface components to the profile creator 15 or other appropriate portion of the administrator console 155. The fields 30 can include, for example, text boxes, dropdown menus, radio buttons, check boxes, buttons, or other user interface components. Additionally, the developer can specify values associated with the fields 30. For example, the developer can specify a name of the field, a field label, a default value, selectable options, non-selectable options, or other values as can be appreciated. Using the profile template designer 130, the developer can create the user interface 10 in accordance with up-to-date capabilities of an operating system 166.

In step 410, the client application 169a can load the profile template designer 130. In one example, the client application 169a is a web browser application that loads the profile template designer 130 by rendering code generated by the profile template designer service 118. In another example, the client application 169a can include a dedicated application. The profile template designer 130 can be shown in a display of the client device 106a for access by the developer to can create and configure a user interface 10 of the profile creator 15 in accordance with up-to-date capabilities of an operating system 166.

In step 415, the client device 106a can send the configuration of the user interface 10 of the profile creator 15 to the management service 115. In other words, the client device 106a can send the categories 20, forms 25, fields 30, arrangement of the fields 30, values, settings, and other data specified by the developer in the profile template designer 130 to the management service 115.

In step 420, the management service 115 can generate metadata 133 based on the configuration made in the profile template designer 130. In one example, the metadata 133 can include, for example, a new user interface 10 to be shown in the administrator console 155 in place of the existing user interface 10. In another example, the metadata 133 can include, for example, changes or an update to the existing user interface 10 based on new capabilities of an operating system 166 or other software component.

In other examples, the metadata 133 includes XML code, HTML code, or other appropriate data for generating a user interface 10 dynamically. For instance, instead of loading a static web page, the metadata 133 can be employed by the client application 121b to generate a user interface 10 generated dynamically or "on the fly," as will be discussed. In one example, the metadata 133 can include data arranged in a hierarchical arrangement where data is nested in tags based on the arrangement of the fields 30. For example, the following XML code can be used to dynamically generate a user interface 10 for a profile creator 15:

```
<?xml version="1.0"?>
...
<field>
    <type>Dropdown Menu</type>
    <label>Minimum Password Length</label>
    <name>min_password_length</name>
    <required>Yes</required>
    <option1>10-15 Chars</option1>
    <option2>16-20 Chars</option2>
    <option3>21-25 Chars</option3>
    <field>
        <type>Textbox</type>
        <name>other_min_password_length</name>
        <label>Other Value</label>
        <required>No</required>
    </field>
</field>
...
```

For instance, the textbox can be a sub-field of the dropdown menu where, if one of the options of the dropdown menu is not suitable, the textbox can be used to specify a minimum password length manually. As can be appreciated, the computing environment 103 or client device 106 can iterate through the XML, line-by-line and generate a corresponding component of a user interface 10.

In step 425, the management service 115 can store the metadata 133 in association with the update to the operating system 166. For example, the management service 115 can store the metadata 133 in the data store 112 as an update to an administrator console 155 based on an updated version of an operating system.

In step 430, the management service 115 can generate an update package 178 for the administrator console 155 that, for example, can be installed by administrators to update various user interfaces 10, settings, or other features of the administrator console 155. For instance, when an updated version of an operating system 166 or other software component becomes available, the management service 115 can generate an update package 178 that allows an administrator to update the administrator console 155 to provide functionality and support for new or updated features of the operating system 166.

In step 435, the management service 115 can notify an administrator of the management service 115 of the update package 178 becoming available for installation. In one example, the management service 115 can generate a notification to be shown to an administrator in the administrator console 155. In other examples, the administrator can be notified through simple messaging service (SMS), email, instant messaging, or other communication medium.

Next, in step 440, the client application 169b of the client device 106c associated with an administrator can be accessed by the administrator to install the update package 178. The administrator can determine whether to install the update package 178 based on, for example, whether the administrator desires to configure capabilities offered in the updated version of the operating system 166. An install of the update package 178 can, for example, replace or update the user interface 10 accessed to generate a configuration profile 152. In other examples, the update package 178 can store the metadata 133 in a suitable directory so that in can be accessed when dynamically generating a user interface 10 for the profile creator 15.

In step 445, the client application 169b can access the administrator console 155 at the direction of the administrator. In some examples, the client application 169b can include a web browser application and the administrator can specify a URL to access an administrator console 155 served up by the management service 115. In other examples, the client application 169b can include a dedicated client application, such as a mobile or personal computer (PC) application. Using the administrator console 155, the administrator can access a user interface 10 for the profile creator 15 to generate a configuration profile 152.

In step 450, the client application 121 can generate the profile creator 15 dynamically using, for example, the metadata 133. In some examples, the metadata 133 includes XML code, HTML code, or other appropriate data. Instead of loading a static web page, the user interface 10 can be generated dynamically, "on the fly," or at run-time. For instance, a server or other computing device loading the profile creator 15 can access the metadata 133 and construct the user interface 10 based on the content of the metadata 133. The dynamically generated user interface 10 for the profile creator 15 is thereby shown to the administrator having fields 30 that match the current capabilities of the operating system 166. The administrator can thus provide configuration settings to the management service 115 that are compatible with the updated version of the operating system 166.

In step 435, the client device 106c can send the configuration settings provided by the administrator in the profile creator 15 to the management service 115. For instance, the values of the fields 30 can be encoded in one or more data packets for transmission over the network 109.

In step 460, the management service 115 can generate a configuration profile 152 based on the configuration settings specified by the administrator. In some examples, the configuration profile 152 includes an XML document that can be made accessible to client devices 106 specified by the administrator. For instance, the administrator can specify the configuration profile 152 in association with a user group 158. Instances of the agent application 127 executed on the client devices 106 that belong to the user groups 158 can access the configuration profile 152 to configure a respective client device 106 as specified by the administrator.

Accordingly, in step 470, the agent application 127 executed on the client device 106b associated with the end user can access the configuration profile 152 to configure the client device 106b in accordance with the configuration profile 152.

Figure 5:
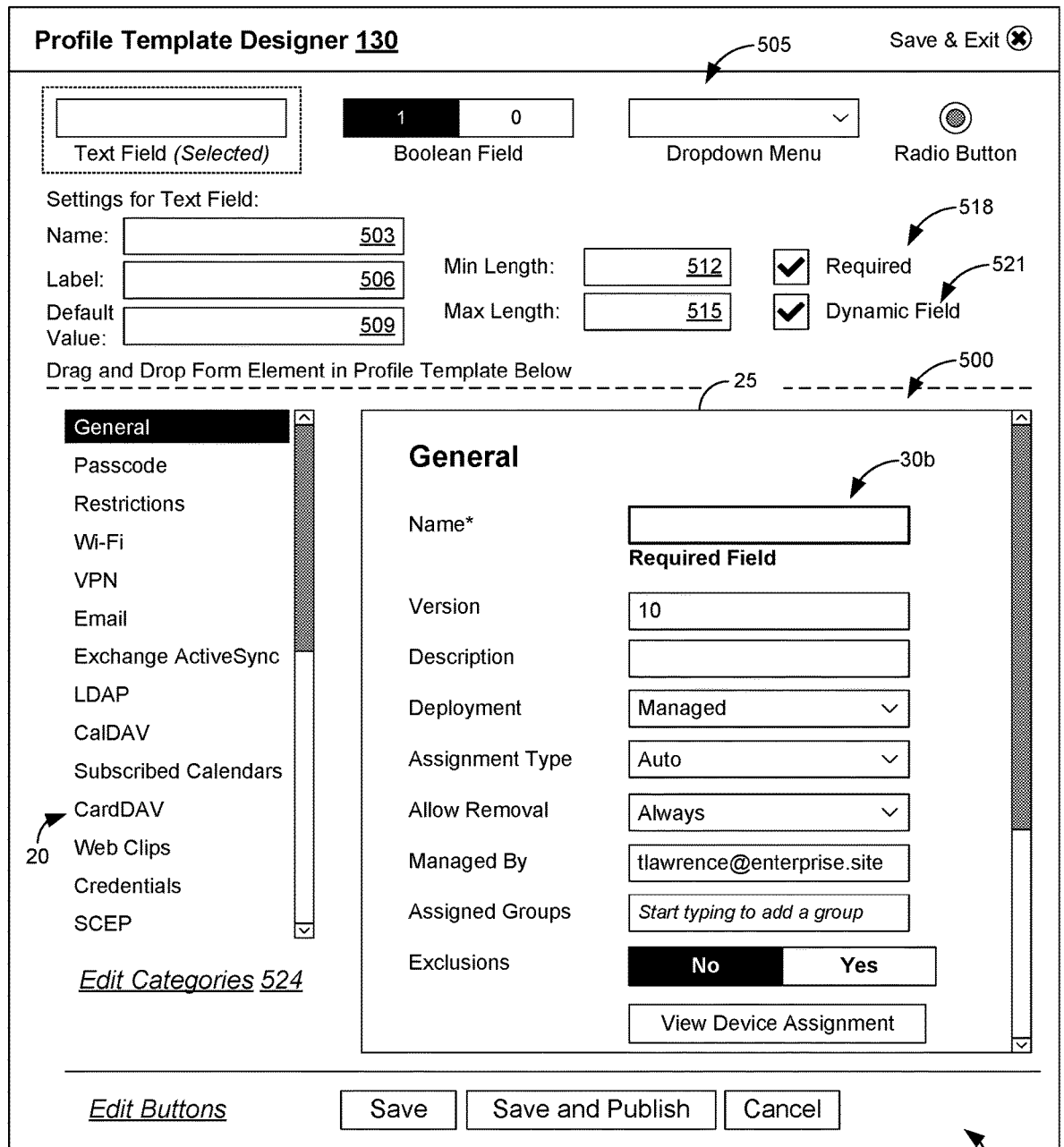
FIG. 5 is a drawing of an example user interface of a profile template designer for creating dynamic user interfaces used to generate configuration profiles.

Turning now to FIG. 5, an example of a user interface 10 of a profile template designer 130 is shown for creating dynamic user interfaces 10 used to generate configuration profiles 152. In some examples, the profile template designer service 118 can the user interface 10 for the profile template designer 130 that can be accessed by a developer, such as a user interface developer, a programmer, or other user with skills suitable for creating a user interface 10.

In the example of FIG. 5, the profile template designer 130 allows a developer of the management service 115 to add categories 20, forms 25, fields 30, or other user interface components to a user interface 10 of a profile creator 15, or to any other appropriate portion of an administrator console 155. In some examples, the fields 30 that can be added to the user interface 10 include, for example, text boxes, Boolean fields, dropdown menus, radio buttons, check boxes, buttons, or other user interface components. Additionally, the developer can specify values associated with the fields 30. For example, the developer can specify a name 503 of the field 30, a field label 506, a default value 509, selectable options, non-selectable options, a minimum length 512, a maximum length 515, or other value, as can be appreciated. The developer can specify whether a field 30 is required using a required checkbox 518. If the field 30 is required, an administrator for an enterprise is required to provide a value for the field 30. The developer can further specify whether a field 30 is dynamic or static, for example, using the dynamic field checkbox 521. If the field 30 is a dynamic field, the field 30 may be dynamically generated at the time the profile creator 15 is accessed, when an update package 178 is installed, or at another appropriate time using the most up-to-date metadata. However, if the field 30 is a static field, the field 30 may be generated without accessing the most up-to-date metadata. Using the profile template designer 130, the developer can configure the user interface 10 in accordance with the most up-to-date capabilities of an operating system 166.

The user interface 10 can include a preview 500 of the user interface 10 of the profile creator 10 as it is developed. To this end, the profile template designer 130 can include a what-you-see-what-you-get (WYSWYG) application. In some examples, examples 505 of user interface components can be shown and a suitable mechanism for adding the user interface components to the preview 500 can be employed. In the example of FIG. 5, the text field can be dragged-and-dropped into the preview 500. Additionally, particular values of the text field can be specified by the developer.

The client device 106a associated with the developer can send the configuration of the profile creator 15 to the management service 115 as configuration data 169. The configuration data 175 can include, for example, the categories 20, forms 25, fields 30, arrangement of the fields 30, values, settings, and other data specified by the developer in the profile template designer 130. The management service 115 can generate metadata 133 that can be employed by the profile creator 15 in dynamically generating a user interface 10.

The categories 20 include various categories associated with managing enrolled client devices 106. In this example of FIG. 5, the categories 20 include "General," "Passcode," "Restrictions," "Wi-Fi," "VPN," "Email," "Exchange ActiveSync," "LDAP," "CalDAV," "Subscribed Calendars," "CardDAV," "Web Clips," "Credentials," "SCEP," or other categories 20. Additionally, the administrator can edit the categories 20 using hyperlink 524, for example, to add or remove categories 20.

The fields 30 associated with the "General" category 20 can include, for example, a "Name" field 30 for a name of the profile to be displayed in the administrator console, a "Version" field 30 for a version of the profile, and a "Description" field 30 for describing a purpose of the configuration profile 152. Additionally, the fields 30 can include, for example, a "Deployment" field 30 that indicates whether the profile will automatically be removed upon device un-enrollment (a "Managed" setting indicates whether the profile can be removed by an administrator of whether the profile remains installed until removed by an end user), an "Assignment Type" field 30 that determines how a profile is deployed to devices (an "Auto" setting indicates that the profile is deployed to all devices automatically and an "Optional" setting indicates that the end user can optionally install the profile or the profile can be deployed to individual devices at an administrator's discretion), an "Allow Removal" field 30 that indicates whether removal of the profile is permitted by end users, a "Managed By" field 30 that includes email address of authorized administrators, an "Assigned Groups" field 30 that includes designations of user groups, an "Exclusions" field 30 that permits or restricts devices from being excluded from the profile, as well as other fields 30.

The developer can also specify fields 30 for categories 20 other than the "General" category 20 shown in FIG. 5. For instance, fields 30 associated with the "Passcode" category 20 can be shown and modified by selecting the "Passcode" category 20. The fields 30 can include default password requirements, such as a maximum or minimum length, permitted or required characters, or other password settings. The "Restrictions" category 20 can include fields 30 that allow an administrator to specify restricted or permitted functions on the client device 106. The "Wi-Fi" category 20 can include fields 30 that allow an administrator to specify Wi-Fi settings for the client devices 106. For example, the developer can create a field 30 that allows an administrator to specify an SSID and a password for enterprise wireless networks.

The "VPN" category 20 can include fields 30 that allow an administrator to specify VPN settings for the client devices 106. For example, the developer can create fields 30 that allow an administrator to specify default settings that allow enrolled client devices 106 to access a VPN that provides an end user to access an enterprise network. The "Email" category 20 and the "Exchange ActiveSync" category 20 can include fields 30 that allow an administrator to specify email settings for the client devices 106 or those associated with Microsoft® Exchange®. For example, the developer can create fields 30 that allow an administrator to specify default email server locations, IP settings, credentials, or other email-related settings.

The "LDAP" category 20 can include fields 30 that allow an administrator to specify Lightweight Directory Access Protocol (LDAP) settings for the client devices 106. For example, the developer can create fields 30 that allow an administrator to specify default settings that enable client devices 106 to locate resources, such as files and other client devices 106 in a network, whether on the Internet or on an enterprise intranet. The "CalDAV" category 20 and the "Subscribed Calendars" category 20 can include fields 30 that allow an administrator to specify Calendaring Extensions to WebDAV (CalDAV) settings and other calendar-related settings for the client devices 106.

Further, the "CardDAV" category 20 can include fields 30 that allow an administrator to specify vCard Extensions to WebDAV (CardDAV) settings for enrolled client devices 106, where CardDAV is an address book protocol that permits end users to access and share contact data on a server. The "Web Clips" category 20 can include fields 30 that allow an administrator to specify "Web Clip" settings for enrolled client devices 106, where "Web Clip" is a feature of various operating systems 166 that allow end users to access URLs by saving them as "web clips" that resemble icons for applications on the home screen of a client device 106. The "Credentials" category 20 can include fields 30 that permits an administrator to specify default login settings or other settings related to credentials that permit a client device 106 to authenticate with the management service 115. The "SCEP" category 20 can include fields 30 that permit an administrator to specify Simple Certificate Enrollment Protocol (SCEP) settings, where SCEP is a protocol used for device enrollment.

Moving on to FIG. 6, shown is a flowchart that provides one example of the operation of a portion of the computing environment 103. The flowchart of FIG. 6 can be viewed as depicting an example of elements of a method implemented by the management service 115, the profile template designer service 118, or other suitable software component according to one or more examples. The separation or segmentation of functionality as discussed herein is presented for illustrative purposes only.

Beginning with step 603, the computing environment 103 can receive a request for a profile template designer 130. For instance, a developer can execute a client application 121, such as a web browser, on a client device 106c to access a profile template designer 130 served up by the profile template designer service 118. The profile template designer 130 allows a developer of the management service 115 to add categories 20, forms 25, fields 30, or other user interface components to a user interface 10 of a profile creator 15, or to any other appropriate portion of an administrator console 155.

In step 606, the profile template designer service 118 can generate a user interface 10 (or user interface data) for the profile template designer 130. For instance, the user interface 10 shown in FIG. 5 can be generated to provide the developer with a mechanism to add or remove categories 20, forms 25, fields 30, or other user interface components.

In step 609, the user interface 10 generated in step 606 can be sent to a client device 106c associated with the developer for rendering in a display 172. The developer of the management service 115 can use the profile template designer 130 to add categories 20, forms 25, fields 30, or other user interface components to a user interface 10 of a profile creator 15. In some examples, the fields 30 that can be added to the user interface 10 include, for example, the fields 30 shown or described with respect to FIG. 5.

Next, in step 612, the computing environment 103 can receive configuration data 169 that describes the configuration of the user interface 10 made in the profile template designer 130. The configuration data 175 can include, for example, the categories 20, forms 25, fields 30, arrangement of the fields 30, values, settings, and other data specified by the developer in the profile template designer 130.

In step 615, the management service 115 can generate metadata 133 based on the configuration made in the profile template designer 130. In some examples, the metadata 133 includes XML code, HTML code, or other appropriate data for generating a user interface 10 dynamically. For instance, instead of loading a static web page, the metadata 133 can be employed by the client application 121b to generate a user interface 10 dynamically.

Next, in step 618, the management service 115 can generate an update package 178 for the administrator console 155 that, for example, can be installed by administrators to update various user interfaces 10, settings, or other features of the administrator console 155. For instance, when an updated version of an operating system 166 or other software component becomes available, the management service 115 can generate an update package 178 that allows an administrator to update the administrator console 155 to provide functionality and support for new or updated features of the operating system 166.

In step 621, the management service 115 can notify an administrator of the management service 115 of the update package becoming available for installation. For example, the management service 115 can generate a notification to be shown to an administrator in the administrator console 155. In other examples, the administrator can be notified through SMS, email, instant messaging, or other communication medium. Thereafter, the process can proceed to completion.

Figure 7:
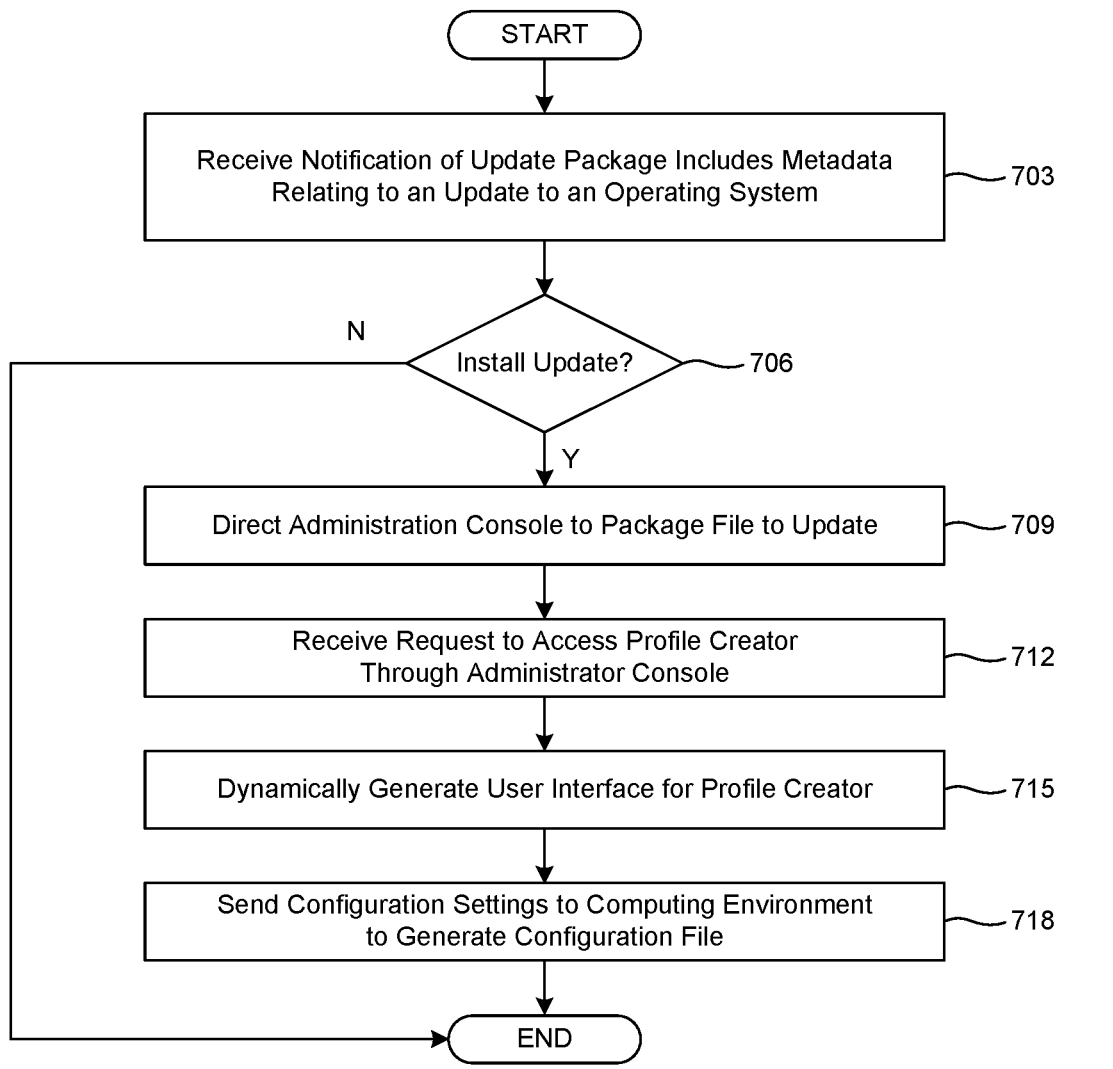
FIG. 7 is a flowchart illustrating functionality implemented by components of the networked environment.

Referring next to FIG. 7, shown is a flowchart that provides one example of the operation of a portion of the client device 106 of an administrator. The flowchart of FIG. 7 can be viewed as depicting an example of elements of a method implemented by a client application 121, such as a web browser, or other suitable software component according to one or more examples. The separation or segmentation of functionality as discussed herein is presented for illustrative purposes only.

In step 703, the client device 106 can receive a notification of an update package 178 available that includes metadata 133 relating to an update to an operating system 166. For instance, the metadata 133 can be generated by the computing environment 103 such that a user interface 10 for the profile creator 15 is dynamically generated using data that is easily updatable based on updates to an operating system 166.

Next, in step 706, the client device 106 can determine whether to install the update package 178. For instance, an administrator may desire to configure an enrolled client device based on new or updated capabilities made through an update to an operating system 166. The update package 178 can be installed to update the operating system 166 using any metadata 133 generated by a developer such that the user interface 10 of the profile creator 15 can provide the appropriate categories 20, forms 25, and fields 30. If the client device 106 determines not to install the update package 178, the process can proceed to completion.

Alternatively, if the client device 106 determines that the administrator desires to install the update package 178, the process can proceed to step 709. In step 709, the client device 106 can direct the administration console 155 to the update package 178 to update the administration console 155.

Next, in step 712, the client device 106 can receive a request to access the profile creator 15. For instance, an administrator can select the new configuration profile component 300, as shown in FIG. 3, to access the profile creator 15.

Thereafter, in step 715, the client device 106 can dynamically generate the user interface 10 for the profile creator 15 using, for example, the metadata 133. For instance, when the request is received to access the profile creator 15, in step 712, the metadata 133 can be accessed to generate the user interface 10 as specified by the metadata 133.

Next, in step 718, the client device 106 can send configuration settings made by the administrator to the computing environment 103 to generate a configuration profile 152. As can be appreciated, the configuration profile 152 can be made accessible to specified client devices 106, such as client devices 106 associated with a specified user group 158. Thereafter, the process can proceed to completion.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 172 upon which a user interface 10 generated by the client application or another application can be rendered. In some examples, the user interface 10 can be generated using user interface data provided by the computing environment 103. The client device 106 can also include one or more input/output devices that can include, for example, a capacitive touchscreen or other type of touch input device, fingerprint reader, or keyboard.

Although the management service 115, the client application, and other various systems described herein can be embodied in software or code executed by general-purpose hardware as discussed above, as an alternative the same can also be embodied in dedicated hardware or a combination of software/general purpose hardware and dedicated hardware.

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A non-transitory computer-readable medium for providing a dynamic runtime interface for device management embodying program instructions executable in at least one computing device that, when executed by the at least one computing device, cause the at least one computing device to:
    access metadata defined by a developer device, the metadata describing a configuration of a user interface made in a profile template designer application accessible on the developer device;
    identify a request for a profile creator received from an administrator device, the profile creator being configured to present the user interface to receive at least one setting for a desired configuration of a client device enrolled with a management service;
    in response to the request for the profile creator being identified, dynamically generate the user interface using the metadata for access by the administrator device, wherein the user interface comprises at least one form configured to receive the at least one setting for the desired configuration of the client device; and
    generate a configuration profile accessible by the client device using the at least one setting, the configuration profile being configured to direct an agent application executable on the client device to configure the client device in accordance with the configuration profile.

2. The non-transitory computer-readable medium of claim 1, wherein the request is received in response to a selection made in an administrator console.

3. The non-transitory computer-readable medium of claim 1, further comprising program instructions that, when executed, cause the at least one computing device to generate an update package for an administrator console that comprises the metadata, the update package being generated in association with an update of an operating system.

4. The non-transitory computer-readable medium of claim 1, further comprising program instructions that, when executed, cause the at least one computing device to generate an initial user interface for the profile template designer application configured to receive the configuration of the user interface for the profile creator.

5. The non-transitory computer-readable medium of claim 1, wherein the at least one form comprises at least one of: a text field, a Boolean field, a dropdown menu, a button, a radio button, and a checkbox.

6. The non-transitory computer-readable medium of claim 1, wherein the metadata comprises an extensible markup language (XML) document.

7. The non-transitory computer-readable medium of claim 6, further comprising program instructions that, when executed, cause the at least one computing device to iterate through the XML document to dynamically generate the user interface.

8. A system for providing a dynamic runtime interface for device management, comprising:
    at least one computing device; and
    a memory comprising program instructions executable in the at least one computing device that, when executed, cause the at least one computing device to:
        access metadata defined by a developer device, the metadata describing a configuration of a user interface made in a profile template designer application accessible on the developer device;
        identify a request for a profile creator received from an administrator device, the profile creator being configured to present the user interface to receive at least one setting for a desired configuration of a client device enrolled with a management service;
        in response to the request for the profile creator being identified, dynamically generate the user interface using the metadata for access by the administrator device, wherein the user interface comprises at least one form configured to receive the at least one setting for the desired configuration of the client device; and
        generate a configuration profile accessible by the client device using the at least one setting, the configuration profile being configured to direct an agent application executable on the client device to configure the client device in accordance with the configuration profile.

9. The system of claim 8, wherein the request is received in response to a selection made in an administrator console.

10. The system of claim 8, further comprising program instructions that, when executed, cause the at least one computing device to generate an update package for an administrator console that comprises the metadata, the update package being generated in association with an update of an operating system.

11. The system of claim 8, further comprising program instructions that, when executed, cause the at least one computing device to generate an initial user interface for the profile template designer application configured to receive the configuration of the user interface for the profile creator.

12. The system of claim 8, wherein the at least one form comprises at least one of: a text field, a Boolean field, a dropdown menu, a button, a radio button, and a checkbox.

13. The system of claim 8, wherein the metadata comprises an extensible markup language (XML) document.

14. The system of claim 13, further comprising program instructions that, when executed, cause the at least one computing device to iterate through the XML document to dynamically generate the user interface.

15. A computer-implemented method for providing a dynamic runtime interface for device management, comprising:
    accessing metadata defined by a developer device, the metadata describing a configuration of a user interface made in a profile template designer application accessible on the developer device;
    identifying a request for a profile creator received from an administrator device, the profile creator being configured to present the user interface to receive at least one setting for a desired configuration of a client device enrolled with a management service;
    in response to the request for the profile creator being identified, dynamically generating the user interface using the metadata for access by the administrator device, wherein the user interface comprises at least one form configured to receive the at least one setting for the desired configuration of the client device; and generating a configuration profile accessible by the client device using the at least one setting, the configuration profile being configured to direct an agent application executable on the client device to configure the client device in accordance with the configuration profile.

16. The computer-implemented method of claim 15, wherein the request is received in response to a selection made in an administrator console.

17. The computer-implemented method of claim 15, further comprising generating an update package for an administrator console that comprises the metadata, the update package being generated in association with an update of an operating system.

18. The computer-implemented method of claim 15, further comprising generating an initial user interface for an profile template designer application configured to receive the configuration of the user interface for the profile creator.

19. The computer-implemented method of claim 15, wherein the at least one form comprises at least one of: a text field, a Boolean field, a dropdown menu, a button, a radio button, and a checkbox.

20. The computer-implemented method of claim 15, wherein the metadata comprises an extensible markup language (XML) document.

* * * * *